US012561365B2

(12) United States Patent
Vollmar et al.

(10) Patent No.: US 12,561,365 B2
(45) Date of Patent: Feb. 24, 2026

(54) DUPLICATE SCENE DETECTION AND PROCESSING FOR ARTIFICIAL INTELLIGENCE WORKLOADS

(71) Applicant: International Business Machines Corporation, Armonk, NY (US)

(72) Inventors: Christopher J. Vollmar, Mississauga (CA); Joseph W. Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 17/468,021

(22) Filed: Sep. 7, 2021

(65) Prior Publication Data

US 2023/0074640 A1 Mar. 9, 2023

(51) Int. Cl.
| | |
|---|---|
| *G06F 16/58* | (2019.01) |
| *G06F 16/587* | (2019.01) |
| *G06F 18/24* | (2023.01) |
| *G06V 20/50* | (2022.01) |

(52) U.S. Cl.
CPC ........ *G06F 16/5866* (2019.01); *G06F 16/587* (2019.01); *G06F 18/24* (2023.01); *G06V 20/50* (2022.01)

(58) Field of Classification Search
CPC .... G06F 16/5866; G06F 16/587; G06F 18/24; G06K 9/6267; G06V 20/30; G06V 20/50; G06V 20/52
USPC ........................................................ 707/602
See application file for complete search history.

(56) References Cited

U.S. PATENT DOCUMENTS

| | | | |
|---|---|---|---|
| 7,668,405 B2 | 2/2010 | Gallagher | |
| 8,622,951 B2 * | 1/2014 | Claus ..................... | A61B 90/20 |
| | | | 606/45 |
| 8,953,836 B1 | 2/2015 | Postelnicu et al. | |
| 9,208,480 B2 * | 12/2015 | Heit ...................... | G06Q 20/042 |
| 9,665,597 B2 | 5/2017 | Haitani et al. | |
| 9,824,299 B2 | 11/2017 | Suman | |

(Continued)

FOREIGN PATENT DOCUMENTS

| | | | | |
|---|---|---|---|---|
| CN | 107133352 A | * | 9/2017 | ............ G06F 16/54 |
| CN | 108322648 A | * | 7/2018 | ............ H04N 23/80 |

(Continued)

OTHER PUBLICATIONS

Papadopoulos et al., "Cluster-Based Landmark and Event Detection for Tagged Photo Collections", in IEEE MultiMedia, vol. 18, No. 1, pp. 52-63, Jan. 2011. (Year: 2011).*

(Continued)

*Primary Examiner* — Phuong Thao Cao
(74) *Attorney, Agent, or Firm* — Jeffrey M. Ingalls

(57) ABSTRACT

Provided is a computer-implemented method, system, and computer program product for detecting and processing a duplicate scene. A processor may receive image data from a plurality of images of a scene into a storage system, the image data including inference labels and contextual information associated with each of the plurality of images. The processor may detect, based on the inference labels and contextual information, that one or more images of the plurality of images is a duplicate of the scene. The processor may execute, in response to detecting that the one or more images of the plurality of images is the duplicate of the scene, an action related to the plurality of images.

14 Claims, 7 Drawing Sheets

400

Receive image data from a plurality of images of a scene into a storage system
405

Detect that one or more images of the plurality of images is a duplicate of the scene
410

Execute, in response to detecting that the second image is a duplicate of the scene, an action related to the first image and the second image
415

(56) References Cited

U.S. PATENT DOCUMENTS

| | | | |
|---|---|---|---|
| 10,013,426 | B2 | 7/2018 | Patil et al. |
| 10,078,781 | B2 * | 9/2018 | Meyer .................... G06Q 10/10 |
| 10,372,547 | B1 * | 8/2019 | Zhu ......................... G06F 3/067 |
| 10,402,655 | B2 * | 9/2019 | Javan Roshtkhari .. G06V 20/48 |
| 10,455,110 | B2 * | 10/2019 | Shih ..................... H04N 1/2104 |
| 10,762,352 | B2 | 9/2020 | Slipenchuk |
| 2007/0030360 | A1 * | 2/2007 | Udono .............. H04N 1/32128 |
| | | | 348/231.99 |
| 2007/0107033 | A1 * | 5/2007 | Ho ...................... G06F 11/1451 |
| | | | 725/115 |
| 2009/0028434 | A1 * | 1/2009 | Vanhoucke ............ G06V 20/60 |
| | | | 382/224 |
| 2009/0204649 | A1 * | 8/2009 | Wong ................. G06F 16/1744 |
| 2009/0306581 | A1 * | 12/2009 | Claus ..................... A61B 90/20 |
| | | | 604/22 |
| 2011/0085728 | A1 | 4/2011 | Gao et al. |
| 2011/0099199 | A1 * | 4/2011 | Stalenhoef .............. G06F 16/51 |
| | | | 707/E17.014 |
| 2011/0196888 | A1 * | 8/2011 | Hanson ................... G06F 16/58 |
| | | | 707/769 |
| 2013/0013683 | A1 * | 1/2013 | Elliott ..................... H04L 51/52 |
| | | | 709/204 |
| 2013/0124508 | A1 * | 5/2013 | Paris ....................... G06F 16/51 |
| | | | 707/723 |
| 2013/0177293 | A1 * | 7/2013 | Mate ................... H04N 9/8205 |
| | | | 386/239 |
| 2014/0081926 | A1 | 3/2014 | Adams et al. |
| 2014/0198986 | A1 * | 7/2014 | Marchesotti ............ G06F 18/28 |
| | | | 382/190 |
| 2015/0058284 | A1 * | 2/2015 | Bell ........................ G06F 16/48 |
| | | | 707/609 |
| 2016/0050285 | A1 * | 2/2016 | von Sneidern .... H04N 1/00137 |
| | | | 709/227 |
| 2016/0050704 | A1 * | 2/2016 | von Sneidern ......... H04L 67/52 |
| | | | 370/329 |
| 2016/0110355 | A1 * | 4/2016 | Charania ................. G06F 16/51 |
| | | | 382/224 |
| 2016/0140417 | A1 * | 5/2016 | Kang .................... G06F 16/583 |
| | | | 345/660 |
| 2016/0196478 | A1 * | 7/2016 | Choi ...................... G06V 10/36 |
| | | | 382/218 |
| 2017/0076156 | A1 * | 3/2017 | Borel .................... G11B 27/031 |
| 2017/0094118 | A1 * | 3/2017 | Fujii ...................... G06F 3/1267 |
| 2017/0364531 | A1 * | 12/2017 | Wu ......................... G06F 16/00 |
| 2018/0336226 | A1 * | 11/2018 | Anorga ............... G06V 30/413 |
| 2019/0042900 | A1 * | 2/2019 | Smith .................... G06V 10/96 |
| 2019/0043201 | A1 * | 2/2019 | Strong .................. G06V 10/96 |
| 2019/0156122 | A1 * | 5/2019 | Lu ......................... G06V 10/761 |
| 2020/0098116 | A1 * | 3/2020 | Rozner ................. G06V 20/10 |
| 2020/0118029 | A1 * | 4/2020 | DeBraal ............ G06Q 30/0201 |
| 2020/0175278 | A1 * | 6/2020 | Hibino .................. G06V 20/30 |
| 2021/0034657 | A1 * | 2/2021 | Kale ...................... G06V 20/35 |
| 2021/0132784 | A1 * | 5/2021 | Conlon ............. G06Q 10/0833 |
| 2021/0133861 | A1 * | 5/2021 | Kumar ................ G06F 18/214 |
| 2021/0209377 | A1 * | 7/2021 | Timor ................... G06F 18/24 |
| 2021/0216666 | A1 * | 7/2021 | Miller ................ G06F 12/1408 |
| 2022/0327678 | A1 * | 10/2022 | Fauber ..................... G06N 3/04 |
| 2025/0217318 | A1 * | 7/2025 | Kernick ............. H04L 67/1097 |

FOREIGN PATENT DOCUMENTS

| | | | | | |
|---|---|---|---|---|---|
| CN | 108846351 | A | * | 11/2018 | ........ G06K 9/00664 |
| CN | 109074358 | A | * | 12/2018 | ........ G06F 16/9537 |
| CN | 111798376 | A | * | 10/2020 | .......... G06K 9/6256 |
| CN | 112069344 | A | * | 12/2020 | |
| CN | 112861941 | A | * | 5/2021 | |
| CN | 112949777 | A | * | 6/2021 | .............. G06K 9/46 |
| EP | 1783611 | A2 | * | 5/2007 | ......... G06F 11/1464 |
| JP | 2004236120 | A | * | 8/2004 | ........... G06V 20/10 |
| WO | 2015158289 | A1 | | 10/2015 | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

310

| Edge Device | Type | Inference Label | Timestamp | Geo-coordinates | Accuracy Value |
|---|---|---|---|---|---|
| 304A | Image A | Broken Water Main | 8:58 | 41.40338, 2.17403 | 0.98 |
| 304B | Image B | Water Main Leak | 9:02 | 41.40340, 2.17404 | 0.85 |
| 304N | Image N | Water Main | 11:45 | 41.40528, 2.17502 | 0.98 |

400

Receive image data from a plurality of images of a
scene into a storage system
405

Detect that one or more images of the plurality of
images is a duplicate of the scene
410

Execute, in response to detecting that the second image
is a duplicate of the scene, an action related to the first
image and the second image
415

DUPLICATE SCENE DETECTION AND PROCESSING FOR ARTIFICIAL INTELLIGENCE WORKLOADS

BACKGROUND

The present disclosure relates generally to the field of data storage and, more specifically, to detecting and processing duplicate scenes from image data produced by edge devices.

Edge computing environments are configured to perform computation and/or data storage closer to the source of the data. By performing edge computing and/or data storage closer to the data source, edge computing environments improve response times for accessing and processing data for associated computing devices.

SUMMARY

Embodiments of the present disclosure include a computer-implemented method, system, and computer program product for detecting and processing a duplicate scene. A processor may receive image data from a plurality of images of a scene into a storage system, the image data comprising inference labels and contextual information associated with each of the plurality of images. The processor may detect, based on the inference labels and contextual information, that one or more images of the plurality of images is a duplicate of the scene. The processor may execute, in response to detecting that the one or more images of the plurality of images is the duplicate of the scene, an action related to the plurality of images.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
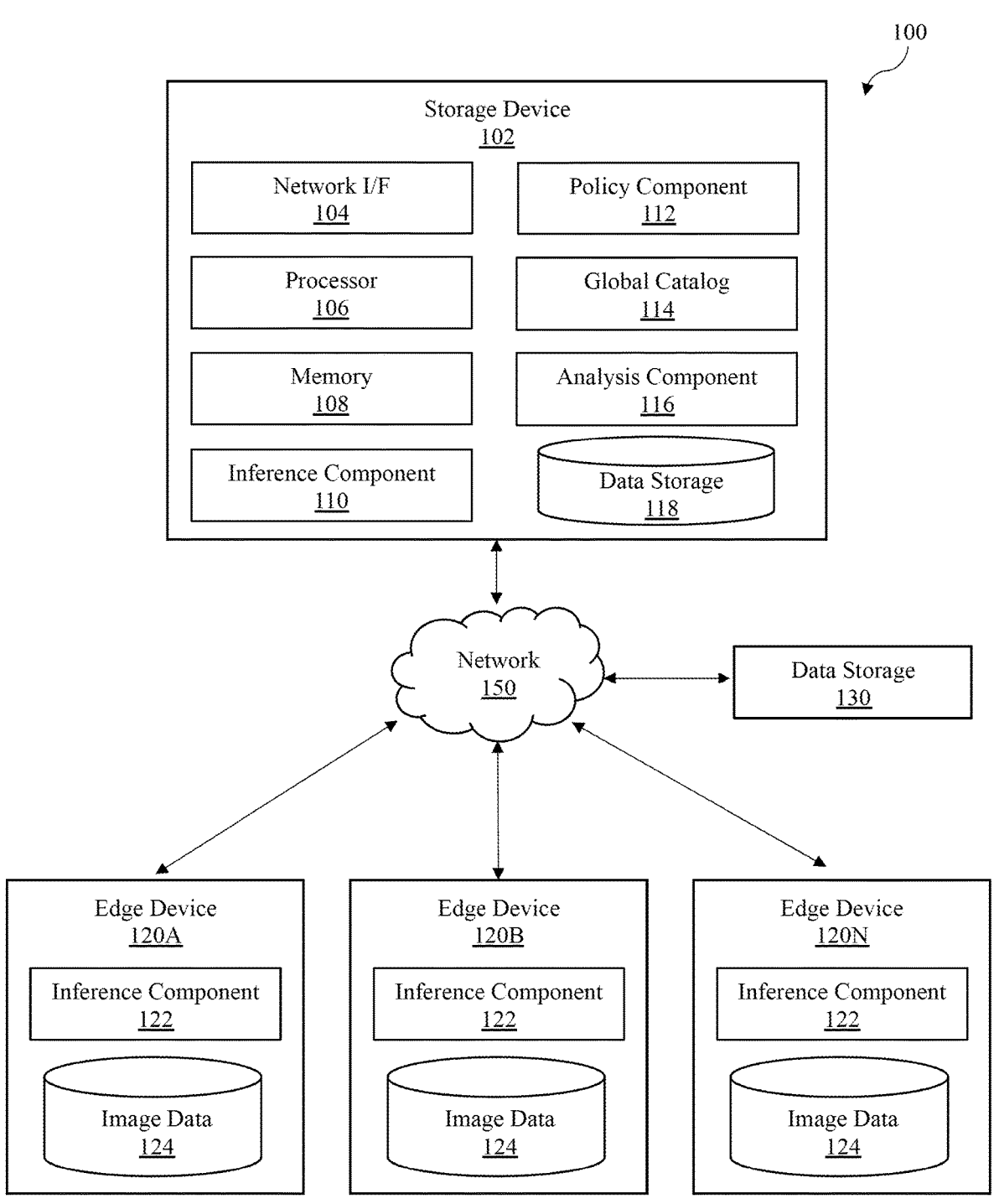
FIG. 1 illustrates a block diagram of an example storage system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of data storage and, more particularly, to detecting and processing duplicate scenes from image data. While the present disclosure is not necessarily limited to such applications, various aspects of the disclosure may be appreciated through a discussion of various examples using this context.

Edge computing environments are configured to perform computation and/or data storage closer to the source of the data. By performing edge computing and/or data storage closer to the data source, edge computing environments improve response times for accessing and processing data for associated computing devices.

In many instances, duplicative data may be produced by the edge devices when generating data for various purposes. For example, multiple edge devices (e.g., Internet of Things (IoT) devices such as cameras, smartphones, smart cars, etc.) may be used to document or record an event or scene. For example, 10 different edge devices may generate 10 instances of image data of the same vehicle crash (i.e., event or scene) and send these 10 instances of image data into a central reporting facility where they are processed. This may result in 10 different incidents and/or workflows being created to address the same vehicle crash.

Further, this raw image data may be sent to a centralized location where image processing and/or analysis occurs. For example, the centralized location may use artificial intelligence to perform various computer vision techniques (e.g., image classification, bounding box detection, semantic segmentation, action recognition, etc.) to identify and/or classify objects (e.g., IoT objects, data objects, visual content of a damaged vehicle from the vehicle crash, etc.) from the raw image data. In such a centralized location, the amount of data generated and managed each time a scene or event is documented may grow exponentially as duplicates of the same scenes/events are sent for processing. For example, in an object storage system, the number of objects may grow into the billions or trillions depending on the processing facility's workload. This results in significant resources being allocated to manage and curate the duplicative data.

Embodiments of the present disclosure include a system, method, and computer program product that detects a duplicate scene from image data generated by edge devices and performs various data processing/management actions related to the duplicative data. Identifying the duplicative data may allow the system to implement more efficient data storage actions such as eliminating or archiving additional copies of similar data of the same event and/or improving efficiencies in streamlining various workflows related to the event.

In embodiments, a storage system may receive image data from a plurality of images of a scene. The storage system may be any type of data storage system (e.g., storage server, object storage system, S3 application programming interface (API), etc.) that is configured to store, encrypt, present, manage, and/or access image data and/or object data. The plurality of images may be any type of images, such as individual images (e.g., pictures, static visual content, etc.) or video images (e.g., dynamic images) of the scene.

In embodiments, the plurality of images of the scene are received or collected from a plurality of edge devices. The edge devices may be configured as any type of computing device configured to generate images, such as an IoT camera, smartphone, smart vehicle, etc. In embodiments, the plurality of edge devices may generate the images of the scene from differing geographical locations. For example, a first edge device may generate an image(s) of a scene from a first location, while a second edge device may generate an image(s) of the same scene from a second location, where the first location and the second location are different.

In embodiments, the image data may be stored as objects that include inference labels and contextual information associated with the plurality of images. In some embodiments, the image data associated with the plurality of images is pre-labeled with inference labels and contextual information. In some embodiments, the inference labels and contextual information are generated and/or extracted by the storage system when storing the images as objects. For example, the inference labels may be generated by an inference component on each of the respective edge devices and/or an inference component on the storage system itself.

The inference labels may infer what type of content the images contain. The inference labels may be based on visual content within the image that can be assigned with fine-grained labels describing major components, coarse-grained labels depicting high level abstractions, or a set of labels revealing various attributes. In embodiments, the inference labels may be generated by performing various computer vision techniques (e.g., image classification, bounding box detection, semantic segmentation, action recognition, etc.) on the plurality of images. Returning to the vehicle crash example from above, a first image may contain an inference label classifying the first image as "vehicle crash" and the second image may contain an inference label classifying the second image as "vehicle accident," where the inference labels are generated from a first edge device and a second edge device, respectively. In some embodiments, the inference labels may be user defined and/or generated.

In some embodiments, the inference label may include an inference accuracy value of the inference result. The inference accuracy value may be any type of value (e.g., percentage, range from 0 to 1, etc.) provided by the inference component on how accurate the inference label is with respect to the given content of the image. In some embodiments, the inference accuracy value may be based on a confidence score. In some embodiments, the inference labels may be stored as custom metadata tags (e.g., x-amz-meta headers) within the storage system, set as user defined extended attributes on a filesystem, or may be pickled (e.g., serializing python objects) in a propriety format in the object itself.

In embodiments, the image data further includes contextual information that may be produced by the edge device(s) when generating the image(s) of the scene. In some embodiments, the contextual information and/or additional contextual information may be extracted/generated when the object is stored and/or inputted to the storage system. For example, contextual information may include metadata generated from when the image was created and/or when the image or object is stored/indexed by the storage system. For example, the storage system may send a metadata event to a global catalog that indexes the location of the object. In embodiments, the contextual information may include various forms of data related to the images such as timestamp information, geo-coordinates, metadata, extended attributes, inference accuracy values, user defined tags, descriptions, classification labels, edge device information, etc. It is noted that the contextual information may include any type of descriptive data related to the images and that the above list is not meant to be limiting.

In embodiments, the storage system may detect, using the inference labels and the contextual information from the image data, that one or more images of the plurality of images are duplicates of the scene. Returning to the example above, the storage system may detect based on the inference labels associated with the first image indicating "vehicle crash" and the second image indicating "vehicle accident" that the second image may be a duplicate of the same scene. The storage system may further confirm that the second image is a duplicate of the scene by further analyzing the contextual information associated with the respective images.

In embodiments, the storage system may include various scene duplication policies that are used to determine the criteria to be used for identifying a duplicate scene from the contextual information. For example, the storage system may utilize a predetermined timestamp threshold and a geo-coordinate threshold, such that if the images were taken within a threshold amount of time (e.g., within 10 minutes, 5 mins, 30 seconds, etc.) from each other and include a geographical location within a certain threshold amount (e.g., 0.009 degrees), then the system may identify that the one or more images are duplicates of the scene. For example, the storage system may analyze the associated timestamp information and geo-coordinates related to the first and second images in conjunction with the inference labels and determine that the images are of the same scene (vehicle crash) because they were taken at relatively the same time and same location.

In another example, the scene duplication policies may analyze similarities of the contextual information associated with the images to determine if the images are duplicates of the scene. Returning to the example above, the storage system may analyze contextual information that was extracted from the images indicating that that a license plate number and/or a vehicle identification number (VIN) of the vehicle associated with the crash in the respective images is the same. This contextual information may be used to determine that the second image is a duplicate of the scene in the first image. In some embodiments, the scene duplication policies may be determined by the storage system automatically using an analysis/machine learning component. In some embodiments, the scene duplication policies may be defined by a user.

In embodiments, the storage system performs and/or executes an action related to the plurality of images in response to detecting that one or more images of the plurality of images are duplicates of the scene. The action may be defined by data management policies related to how the images are stored, migrated, managed, deleted, etc. In embodiments, when one or more images of the plurality of images are determined to be duplicates of the scene, the duplicate data or objects may be tagged in a global catalog and filtered according to the data management policies.

Returning to the previous example, the storage system may store the first image of the scene on active storage, while migrating the second image that was determined to be a duplicate of the scene to an alternative storage component. For example, the storage system may migrate images or objects that are duplicates of the scene to an object storage tier or tape drive. In some embodiments, the storage system may delete any images that are duplicates of the scene. In some embodiments, the system may determine which image of the scene to store on active storage by identifying the image with the highest inference accuracy value and migrate and/or delete the remaining duplicative images with lower inference accuracy values. In this way, the storage system reduces duplicative data stored on active storage which results in quicker response/access times when accessing data. Further, the storage system may reduce costs associated with storing duplicative data by migrating the duplicate scene images to a cheaper alternative storage or deleting the duplicative data all together.

In some embodiments, the storage system may identify a plurality of workflows (or workloads) associated with the duplicate data and perform an action related to the workflows. For example, the storage system may delete or remove workflows that are associated with image data or objects that have been determined to be duplicates of the scene. Returning to the previous example, the storage system may delete workflows created using the duplicative data, such as workflows for initiating emergency personnel to respond to the vehicle crash. In this way, the storage system automatically reduces the number of duplicative workflows in order to address the scene or event more efficiently.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of example storage system 100, in accordance with embodiments of the present disclosure. In the illustrated embodiment, storage system 100 includes storage device 102 that is communicatively coupled to edge device 120A, edge device 120B, edge device 120N (collectively referred to as edge devices 120) and data storage 130 via network 150. Storage device 102, edge devices 120, and data storage 130 may be configured as any type of computer system and may be substantially similar to computer system 1101 of FIG. 5. In some embodiments, storage device 102 and data storage 130 may be configured as a secured data repository or a secured data storage system that requires an authorization to access image data and/or objects (e.g., Internet of Things (IOT) objects, data objects, etc.) secured thereon. In embodiments, storage device 102 and data storage 130 may be established within an edge computing network topology 220 as described in FIG. 2. For example, storage device 102 and data storage 130 may be configured as an edge cluster, network edge device, regional edge device, and/or cloud device such as an on-premises (e.g., within an organization's data center) or public cloud computing environment, where they can be accessed by edge devices 120.

Network 150 may be any type of communication network, such as a wireless network, edge computing network, a cloud computing network, or any combination thereof. Network 150 may be substantially similar to, or the same as, edge computing environment 200 described in FIG. 2, and/or cloud computing environment 50 described in FIG. 6. Consistent with various embodiments, an edge computing environment and a cloud computing environment may include a network-based, distributed data processing system that provides one or more edge/cloud computing services. Further, an edge computing environment and/or cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, storage device 102 may communicate with edge devices 120 and data storage 130 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments storage device 102 may communicate with data storage 130 using a hardwired connection, while communication between edge devices 120 and storage device 102 may be through a wireless communication network.

In embodiments, edge devices 120 may be any type of computing devices (e.g., IoT device, laptop, tablet, smartphone, vehicle, camera, and the like) that are configured to generate image data 124. Image data 124 may comprise one or more images (e.g., pictures, video content, visual content) of a scene. In some embodiments, edge devices 120 may each include an inference component 122 configured to generate inference labels and or contextual information associated with the image data 124. In embodiments, inference component 122 may utilize various computer vision techniques to generate the inference labels and/or the contextual information. In some embodiments, inference component 122 may include subcomponents for generating the contextual information. For example, inference component 122 may include a GPS module to determine geospatial coordinates of the edge device 120, particularly in embodiments where the edge device 120 is mobile. In some embodiments, edge devices 120 may not include an inference component and the inference labels and/or contextual information may be generated by inference component 110 of store device 102 or user defined. In embodiments, image data 124 is sent to or collected/inputted/received by storage device 102.

In the illustrated embodiment, storage device 102 includes network interface (I/F) 104, processor 106, memory 108, inference component 110, policy component 112, global catalog 114, analysis component 116, and data storage 118. In embodiments, edge devices 120 and data storage 130 may also contain similar components (e.g., processors, memories, network I/F, analysis components, etc.) as storage device 102; however, for brevity purposes these components are not shown.

In embodiments, storage device 102 is configured to receive image data 124 as objects (e.g., IoT objects, data objects, etc.). For example, storage device 102 may be configured as an object storage device. In some embodiments, the image data 124 received from edge devices 120 may include the pre-labeled inference information/labels and contextual information. The inference information may include an inference accuracy value that indicates the accuracy of the inference result. For example, the inference accuracy value may be based on a confidence score/value associated with the inference result as determined by the inference component 110 and/or inference component 122.

In some embodiments, the inference information may be stored as a custom metadata tag, may comprise user defined extended attributes on a filesystem, or may be pickled in a proprietary format in the object itself. For example, the inference information related to the image data/object may be inputted into the storage device 102 using a custom metadata tag (e.g., x-amz-meta header) with the original metadata when the object is written or modified and automatically indexed into global catalog 114. In some embodiments, if the inference information is inputted with user defined extended attributes or as a pickled object, a workflow is triggered to read the inference information from the user defined extended attributes stored on a node associated with a file in the storage system 100 or from the proprietary pickle format of the object.

In some embodiments, the image data 124 or objects may be received from edge devices 102 that do not include any pre-labeled inference information. In such an instance, inference component 110 is configured to generate the inference information and/or inference labels. For example, an extraction policy may be triggered by the storage device 102 to send the newly inputted image data/objects to the inference component 110 to generate the inference information and capture the results in global catalog 114.

In some embodiments, the inference component 110 may be configured to extract additional contextual information (e.g., metadata) from the image data 124 or objects. Additional contextual metadata may be extracted from the objects in a similar way to the extraction of the inference information. For example, the contextual information and/or metadata may be set as custom meta headers in an object store, as user defined extended attributes in the filesystem, or picked with the object. In the case of custom meta headers, the additional contextual information is sent with the metadata event and indexed into the global catalog 114. In the case where the extended attributes are stored in user defined extended attributes or picked with the object, a workflow is triggered to extract the contextual information. In some embodiments, metadata may be embedded in the headers of well-defined file formats such as exif, dicom, pdf, etc., and the workflow may extract one or more of the header content from the image data/object and index the content into the global catalog 114.

In embodiments, policy component 112 is configured to implement various policies related to how the image data/objects, inference information, and contextual information is managed and processed. Policy component 112 may implement extraction polices regarding how to extract inference information and contextual information and how to manage that information. Policy component 112 may create and implement scene duplication policies that determine what criteria should be used for determining a duplicate scene.

For example, policy component 112 may create threshold policies regarding comparison of classification labels, geo-coordinates, and timestamp information related to when an image or video was generated to determine if a given image is a duplicate of a scene. In embodiments, policy component 112 may create and implement policies defining how to manage the image data 124 or object data that is found to be duplicative. For example, a policy may be implemented that keeps the highest inference accuracy value on active or primary storage (data storage 118) and migrates the duplicative image data to a lower cost storage. For example, data storage 130 may be any kind of data storage system, such as an object storage tier or tape drive. In some embodiments, policy component 112 may create policies to delete the duplicative data. In some embodiments, the policy component 112 may concatenate the policies described above into one single policy that performs end to end processing.

Analysis component 116 is configured to perform analytics processing on data associated with storage system 100. In some embodiments, analysis component 116 can utilize machine learning and/or deep learning, where algorithms or models can be generated by performing supervised, unsupervised, or semi-supervised training on historical image data decisions to improve the accuracy of determining duplicative data based on historical performance of the system. For example, the analysis component 116 may determine over time that the accuracy of detecting duplicate scenes from the received images may be improved if various threshold values are reduced (or in other instances increased), such that images having closer timestamps values and/or closer geo-coordinates would be more accurately determined as duplicative. Accordingly, the analysis component 116 may automatically update the policies implemented by the policy component 112 to improve the accuracy of the storage system 100.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of data content management system 100. In some embodiments, however, individual components may have greater or lesser complexity than as represented in FIG.

1, components other than or in addition to those shown in FIG. 1 may be present, and the number, type, and configuration of such components may vary. Likewise, one or more components shown within storage system 100 may not be present, and the arrangement of components may vary.

For example, while FIG. 1 illustrates an example storage system 100 having a single storage device 102, three edge devices 120, and a single data storage 130 that are communicatively coupled via a single network 150, suitable network architectures for implementing embodiments of this disclosure may include any number of storage systems, storage devices, edge devices, data storages, and networks. The various models, modules, systems, and components illustrated in FIG. 1 may exist, if at all, across a plurality of storage systems, storage devices, edge devices, data storages, and networks.

Figure 2:
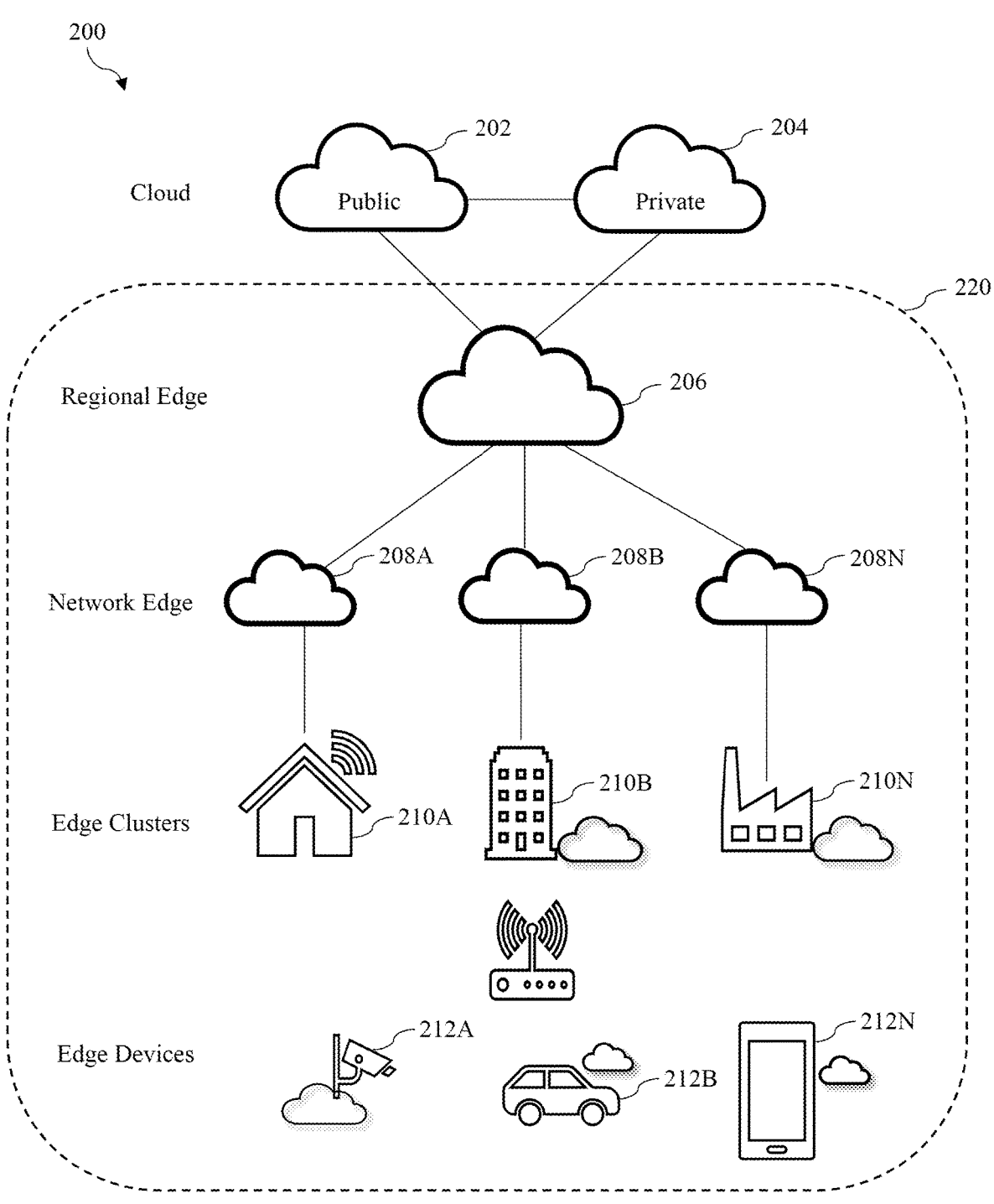
FIG. 2 illustrates a block diagram of an example edge architecture, in accordance with embodiments of the present disclosure.

Referring now to FIG. 2, shown is an example edge computing architecture 200, in accordance with embodiments of the present disclosure. In the illustrated embodiment, public cloud 202 and private cloud 204 are communicatively connected to edge network topology 220. In embodiments, public cloud 202 and private cloud 204 may be substantially similar to cloud computing environment 50 described in FIG. 6. In some embodiments, public cloud 202 and private cloud 204 may be linked such that they are collectively a hybrid cloud.

Edge network topology 220 illustrates the edge environment where storage system 100 of FIG. 1 resides. In the illustrated embodiment, edge network topology 220 includes regional edge 206, network edge 208A, network edge 208B, network edge 208N (collectively referred to as network edges 208), edge cluster 210A, edge cluster 210B, edge cluster 210N (collectively referred to as edge clusters 210), edge device 212A, edge device 212B, and edge device 212N (collectively referred to as edge devices 212) that are communicatively connected to each other via a distributed computing network. In some embodiments, storage device 102 may be configured as regional edge 206, one of network edges 208, and/or one of edge clusters 210. In embodiments, edge devices 120 may be configured as edge devices 212. In embodiments, edge network topology 220 is configured to bring analytical computational resources closer to the end users and therefore increase the responsiveness and throughput of applications. By reducing duplicative data, specifically related to image data that is processed related to duplicate scenes, the use of the edge network topology 220 significantly outperforms a traditional cloud-based only system by reducing data access response times and management costs.

Figures 3A, 3B:
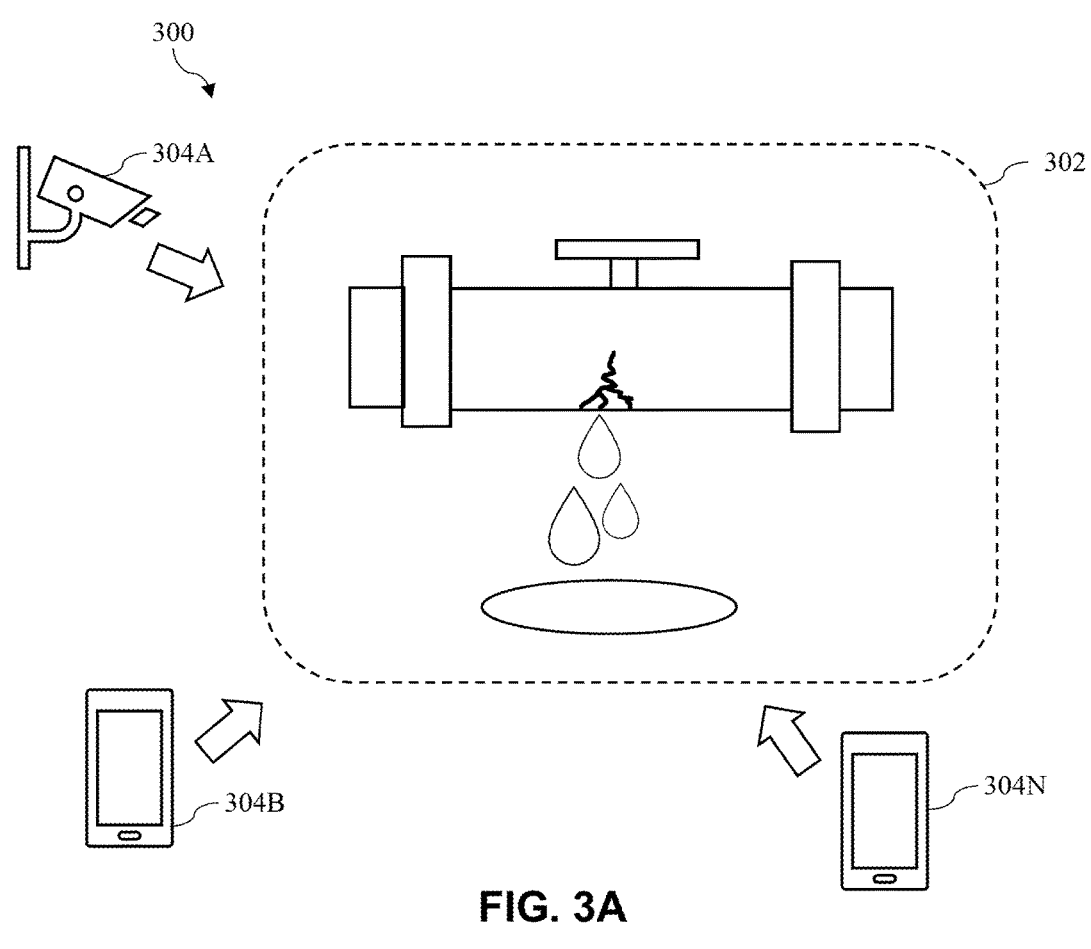
FIG. 3A illustrates an example diagram for generating image data of a scene, in accordance with embodiments of the present disclosure.
FIG. 3B illustrates an example image data table of a scene, in accordance with embodiments of the present disclosure.

Referring now to FIG. 3A, shown is an example diagram 300 for generating image data of a scene 302, in accordance with embodiments of the present disclosure. In the illustrated embodiment, the scene 302 depicts a water main break. Edge device 304A, edge device 304B, and edge device 304N (collectively referred to as edge devices 304) generate image data related to the scene 302. In the illustrated embodiment, the edge devices 304 are each depicted at three separate and distinct geographical locations when generating image data from the scene 302.

Referring now to FIG. 3B, shown is an example image data table 310 generated from the image data related to scene 302, in accordance with embodiments of the present disclosure. In the illustrated embodiment, the data table 310 includes inference information and contextual information related to image A, image B, and image N that were generated from edge device 304A, edge device 304B, and edge device 304N, respectively. The image data generated from the edge devices 304 may be received by the storage system 100 and saved/stored/managed as objects that include inference information and contextual information. In the illustrated embodiment, each of the images includes an inference label, timestamp, geo-coordinates, and an inference accuracy value.

In embodiments, storage system 100 may utilize the inference labels to make determinations on whether each of the respective images is a duplicate of the scene 302. For example, image A and image B include inference labels having similar descriptions of "Broken Water Main" and "Water Main Leak," respectively. While image N has an inference label indicating "Water Main." Storage system 100 may use these inference labels to determine that image B is a duplicate of image A because they include similar inference labels indicating some type of water main break or leak, while image N is not a duplicate of the scene because it indicates only a water main.

In embodiments, storage system 100 may utilize the contextual information in the data table 310 to make further determinations and/or confirmation regarding whether a given image is a duplicate of the scene 302. For example, image A includes a timestamp of 8:58 and geo-coordinates of 41.40338, 2.17403, image B includes a timestamp of 9:02 and geo-coordinates 41.40340, 2.17404, and image N includes a timestamp of 11:45 and geo-coordinates 41.40528, 2.17502. The storage system 100 may utilize a predetermined timestamp threshold and/or a predetermined geo-coordinate threshold to determine if an image is a duplicate of the scene 302.

For example, the storage system 100 may utilize a timestamp threshold of less than 10 minutes to determine/detect that an image is a duplicate of the scene. Here, image A and image B would meet the timestamp threshold because there is only a difference of 4 minutes between the two images, while image N may not meet the threshold because there is a difference of more than 10 minutes between the respective images. In another example, the storage system 100 may utilize a geo-coordinate threshold of less than or equal to 0.001 degrees for differences in both the longitude and the latitude coordinates of the images to determine if a given image is a duplicate of the scene. Using the example geo-coordinate threshold, image B would be determined to be a duplicate of the same scene captured by image A, while image N would not be determined to be a duplicate scene since it would fail to meet the threshold value.

In some embodiments, the storage system 100 may utilize the inferential and/or contextual information to generate a comparison score that indicates the likelihood that two images are of the same scene. For example, the system may generate a score by comparing all of the inference label, the timestamp, and the geo-coordinates between images. The storage system 100 may apply one or more rules to generate the score. The rules may indicate, for example, thresholds related to the maximum difference between values of given piece of contextual information (e.g., maximum time difference) and/or weights to generate the score. For example, the weights may indicate that close geo-coordinates are most important since images with different geo-coordinates are highly unlikely to be of the same scene, followed by timestamp and then inference label.

In some embodiments, the storage system 100 may determine which image of the scene to keep on active storage and which image to migrate or delete by using the inference accuracy value. In the illustrated embodiment, the storage system 100 may keep image A on active storage because it includes an inference accuracy value of 0.98 which is higher than the inference accuracy value of 0.85 for image B. The storage system 100 may migrate or delete image B based on the scene duplication policies implemented by the system. Because image N was not determined to be a duplicate of the scene, the storage system 100 would keep image N on active storage.

Figure 4:
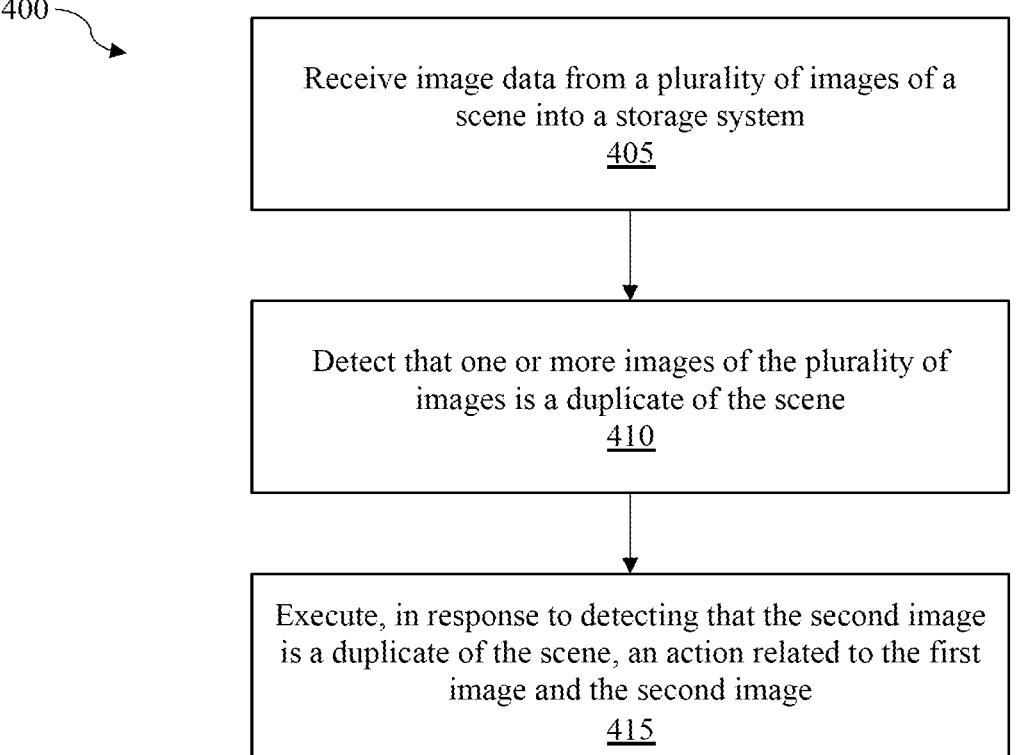
FIG. 4 illustrates a flow diagram of an example process for detecting and processing a duplicate scene, in accordance with embodiments of the present disclosure.

Referring now to FIG. 4, shown is a flow diagram of an example process 400 for detecting and processing a duplicate scene, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In embodiments, the process 400 may be performed by processor 106 of storage device 102 exemplified in FIG. 1.

The process 400 begins by receiving image data from a plurality of images of a scene into a storage system. This is illustrated at step 405. The storage system may be configured as storage system 100 described in FIG. 1. The plurality of images may be generated from a plurality of edge devices that are communicatively connected to the storage system. In embodiments, the plurality of edge devices may generate the images of the scene from differing geographical locations. Returning to the example from FIG. 3A, each of the edge devices 304 are located in different geographical locations when capturing images of scene 302. For example, edge device 304A may generate an image(s) of the scene 302 from a first location, while edge device 304B may generate an image(s) of the scene 302 from a second location, where the first location and the second location are different.

The images include inference labels and contextual information associated with each of the plurality of images. An example of the inference labels and contextual information is described in table 310 of FIG. 3B. In some embodiments, the image data associated with the plurality of images is pre-labeled with inference labels/information and contextual information. In some embodiments, the inference labels and contextual information are generated by the storage system when storing the images as objects. The inference labels may infer what type of content the image contains. For example, the inference labels of table 310 indicate that image A is of a "Broken Water Main," image B is of a "Water Main Leak", and image N is of a "Water Main." Further, each of the images includes contextual information including timestamps, geo-coordinates, and an inference accuracy value.

The process 400 continues by detecting, based on the inference labels and contextual information, that one or more images of the plurality of images is a duplicate of the scene. This is illustrated at step 410. Returning to the table 310, the storage system may detect based on the inference labels associated with image A indicating "Broken Water Main" and image B indicating "Water Main Leak" that image B may be a duplicate of the same scene since the labels are similar, while image N may not be detected as being a duplicate since the inference label fails to include any descriptive content indicating a broken or leaking water main.

In embodiments, the storage system may further confirm that image B is a duplicate of the scene by further analyzing the contextual information associated with the respective images. For example, the storage system may utilize both a predetermined timestamp threshold and a geo-coordinate threshold, such that if the images were taken within a threshold amount of time (e.g., within 10 minutes, 5 mins, 30 seconds, etc.) from each other and include a geo-coordinate within a certain threshold amount (e.g., 0.009 degrees, 0.1 degrees, etc.) then the system may identify that the one or more images are a duplicate of the scene.

Returning to the table 310 from FIG. 3B, the storage system may analyze the associated timestamp information and geo-coordinates related to image A and image B in conjunction with the inference labels and determine that the images are of the same scene 302 because they were taken at relatively the same time and same location, while image N may be determined to be of a different scene (e.g., an image of the water main after it was repaired and no longer leaking or a different water main based on the geo-coordinates) because both the timestamp and geo-coordinate thresholds were not met.

The process 400 continues by executing, in response to detecting that the one or more images of the plurality of images is the duplicate of the scene, an action related to the plurality of images. This is illustrated at step 415. The action may be defined by data management policies related to how the images are stored, migrated, managed, deleted, etc. In embodiments, the action may comprise at least one of the following actions: storing a first image of the scene on active storage; migrating the one or more images that is the duplicate of the scene to an object storage tier; migrating the one or more images that is the duplicate of the scene to a tape drive; and/or deleting the one or more images that is the duplicate of the scene. It is noted that the above list of actions is not meant to be limiting and other actions may be implemented.

Returning to the table 310 of FIG. 3B, the storage system may keep image A on active storage because it includes an inference accuracy value of 0.98 which is higher than the inference accuracy value of 0.85 for image B. The storage system 100 may migrate or delete image B based on the scene duplication policies implemented by the system. Because image N was not determined to be a duplicate of the scene, the storage system 100 may keep image N on active storage.

In some embodiments, the storage system may identify a plurality of workflows (or workloads) associated with the duplicate image data and perform an action related to the workflows. For example, the storage system may modify and/or delete one or more workflows created using the duplicative data, such as workflows for deploying maintenance personnel to repair to the leaking water main. Deleting the workflows associated with the duplicative data prevents redundant and/or unnecessary deployment of resources for addressing the same scene or event.

Figure 5:
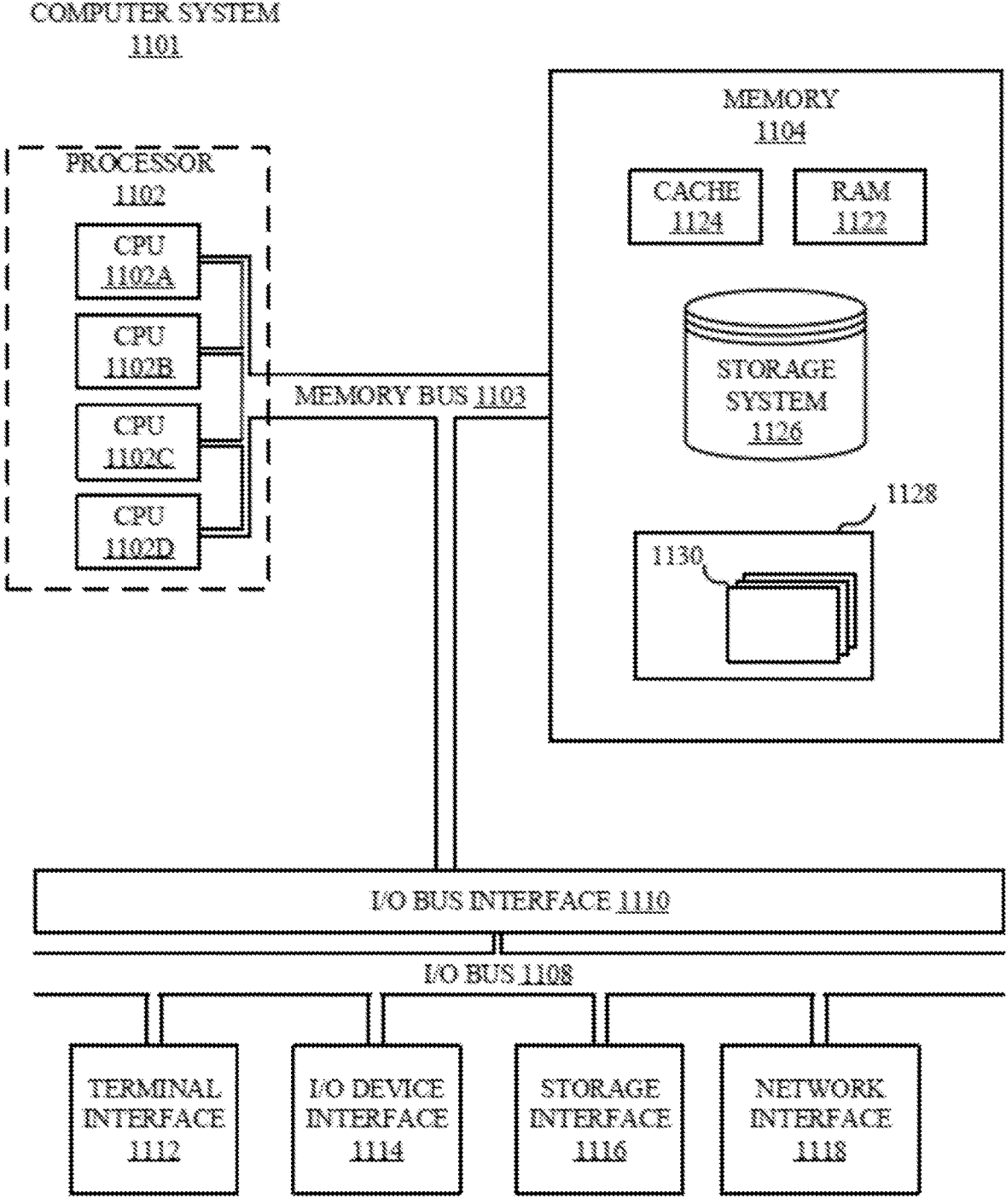
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 400 as described in FIG. 4). In some embodiments, the computer system 1101 may be configured as storage system 100 of FIG. 1.

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
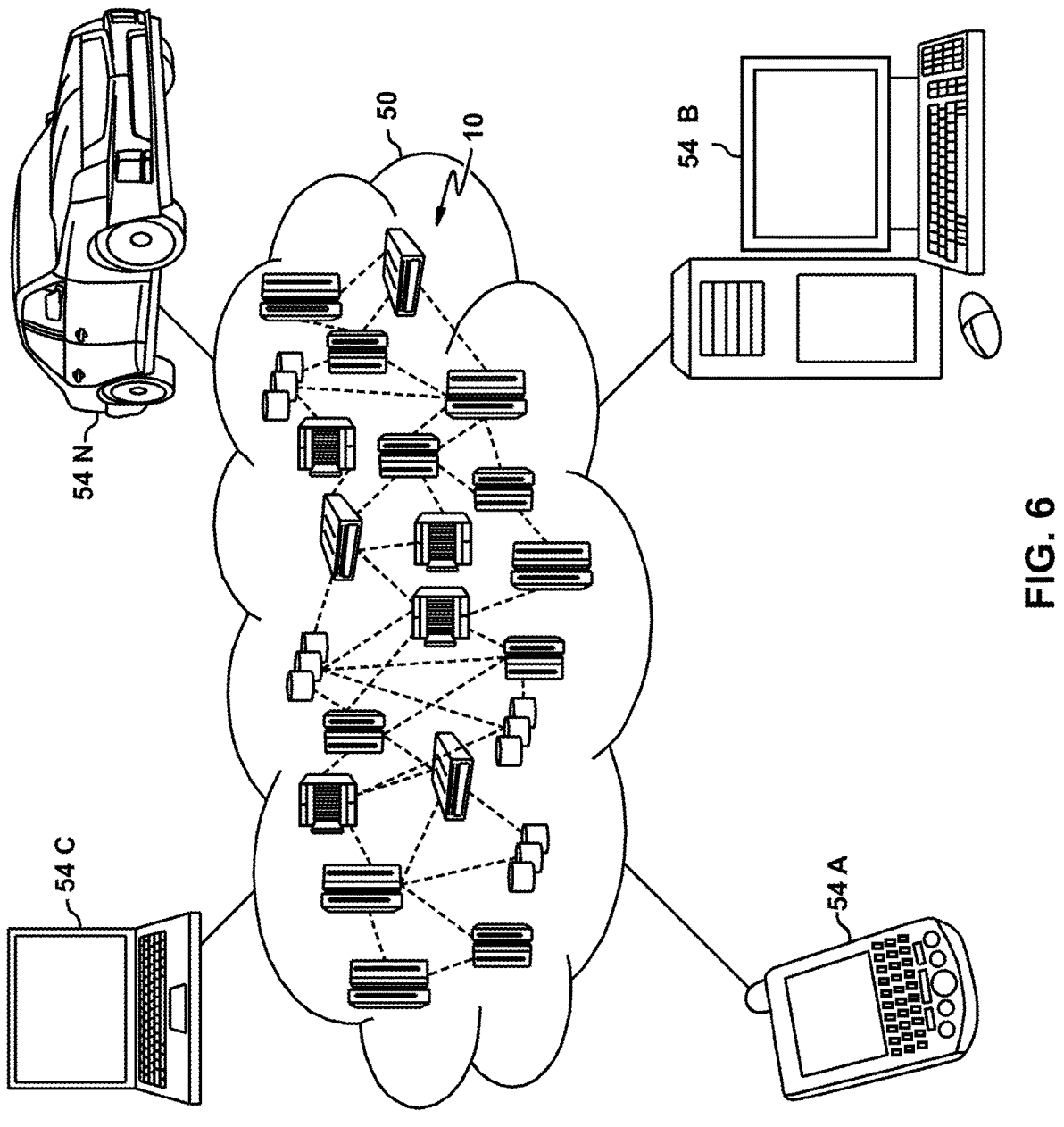
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
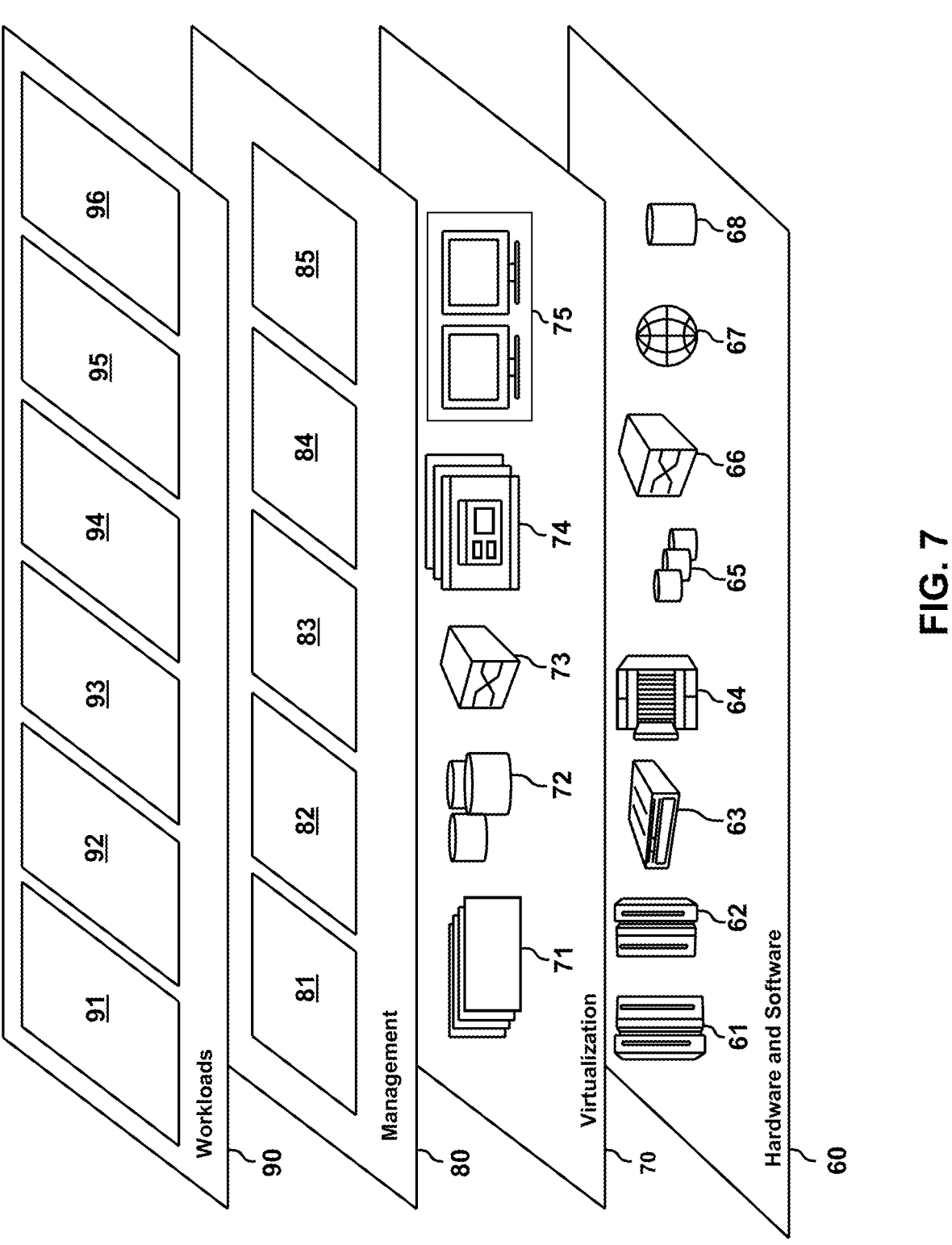
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and duplicate scene detection software 68 in relation to the storage system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and duplicate scene detection and processing 96. For example, storage system 100 of FIG. 1 may be configured to detect duplicate scenes using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for detecting and processing a duplicate scene, the method comprising:

receiving image data from a plurality of images of a first scene into a storage system on an edge computing network, wherein the image data comprises inference labels and contextual information associated with each image of the plurality of images, and wherein the plurality of images of the first scene were generated by a plurality of different cameras in different geographical locations;

generating a comparison score for each two images of the plurality of images based on inference labels and contextual information, wherein the comparison score indicates a likelihood that the two images are images of a same event at the first scene;

determining that two or more images of the plurality of images are images of the same events at the first scene based on generated comparison scores;

generating an inference accuracy value for each inference label associated with each image of the two or more images, wherein the inference accuracy value indicates how accurate an inference label is with respect to the given content of each image;

selecting a first image of the two of more images to be stored on active storage based on the first image having a highest inference accuracy value of the two or more images;

storing the first image of the two or more images on the active storage and migrating a second image of the two or more images to an object storage tier;

determining an event depicted in the second image based on an inference label associated with the second image;

identifying one or more workflows associated with responding to the event; and deleting or modifying the one or more workflows associated with responding to the event depicted in the second image.

2. The method of claim 1, further comprising migrating a third image of the two or more images to a tape drive.

3. The method of claim 1, further comprising deleting a third image of the two or more images.

4. The method of claim 1, wherein the image data is pre-labeled with the inference labels and contextual information.

5. The method of claim 1, wherein the contextual information includes geo-coordinates and timestamp information for each of the plurality of images.

6. The method of claim 1, further comprising:

tagging duplicate image data of the two or more images of the same event at the first scene in a global catalog; and filtering the duplicate image data according to one or more data management policies.

7. The method of claim 1, further comprising:

storing a third image on the active storage, wherein the third image is not one of the two or more images of the same event at the first scene.

8. The method of claim 1, wherein an inference label of the inference labels is determined using at least one computer vision technique.

9. A system for detecting and processing a duplicate scene, comprising:

a processor; and a computer-readable storage medium communicatively coupled to the processor and storing program instructions which, when executed by the processor, cause the processor to perform a method comprising:

receiving image data from a plurality of images of a first scene into a storage system on an edge computing network, wherein the image data comprises inference labels and contextual information associated with each image of the plurality of images, and wherein the plurality of images of the first scene were generated by a plurality of different cameras in different geographical locations;

generating a comparison score for each two images of the plurality of images based on inference labels and contextual information, wherein the comparison score indicates a likelihood that the two images are images of a same event at the first scene;

determining that two or more images of the plurality of images are images of the same events at the first scene based on generated comparison scores;

generating an inference accuracy value for each inference label associated with each image of the two or more images, wherein the inference accuracy value indicates how accurate an inference label is with respect to the given content of each image;

selecting a first image of the two of more images to be stored on active storage based on the first image having a highest inference accuracy value of the two or more images;

storing the first image of the two or more images on the active storage and migrating a second image of the two or more images to an object storage tier;

determining an event depicted in the second image based on an inference label associated with the second image;

identifying one or more workflows associated with responding to the event; and deleting or modifying the one or more workflows associated with responding to the event depicted in the second image.

10. The system of claim 9, further comprising deleting a third image of the two or more images.

11. The system of claim 9, wherein the contextual information includes geo-coordinates and timestamp information for each of the plurality of images.

12. A computer program product comprising a computer-readable storage medium having program instructions embodied therewith, the program instructions executable by a processor to cause the processor to perform a method comprising:

receiving image data from a plurality of images of a first scene into a storage system on an edge computing network, wherein the image data comprises inference labels and contextual information associated with each image of the plurality of images, and wherein the plurality of images of the first scene were generated by a plurality of different cameras in different geographical locations;

generating a comparison score for each two images of the plurality of images based on inference labels and contextual information, wherein the comparison score indicates a likelihood that the two images are duplicate images of a same event at the first scene;

determining that one two or more images of the plurality of images is a duplicate image of are images of the same events at the first scene based on the-generated comparison scores;

generating an inference accuracy value for each inference label associated with each image of the ene-two or more images, wherein the inference accuracy value indicates how accurate an inference label is with respect to the given content of each image;

selecting a first image of the first scene-two of more images to be stored on active storage based on the first image having a highest inference accuracy value of the duplicate-two or more images;

storing the first image of the first scene-two or more images on the active storage and migrating a second image that is the one of the duplicate images of the first image of the two or more images to an object storage tier;

determining an event depicted in the second image of the first scene-based on an inference label associated with the second image;

identifying one or more workflows associated with responding to the event; and deleting or modifying the one or more workflows associated with responding to the event depicted in the second image.

13. The computer program product of claim 12, wherein the contextual information includes geo-coordinates and timestamp information for each of the plurality of images.

14. The computer program product of claim 13, wherein determining that the two or more images of the plurality of images are the images of the same event at the first scene comprises:

comparing a difference of the geo-coordinates and timestamp information for each two images of the plurality of images to a predetermined threshold; and determining, in response to the predetermined threshold being met, the two or more images of the plurality of images are images of the same event at the first scene.

\* \* \* \* \*